June 30, 1959  L. PÉRAS  2,892,658
TRANSPARENT PILLAR CONSTRUCTION FOR
VEHICLE WINDOWS OR DOORS
Filed June 30, 1955

United States Patent Office 2,892,658
Patented June 30, 1959

2,892,658

TRANSPARENT PILLAR CONSTRUCTION FOR VEHICLE WINDOWS OR DOORS

Lucien Péras, Billancourt, France, assignor to Regie Nationale des Usines Renault, Billancourt, France Application June 30, 1955, Serial No. 519,221

Claims priority, application France August 4, 1954

4 Claims. (Cl. 296—44.5)

The invention relates to window or door pillars and its main application is for window pillars in the bodywork of motor vehicles.

In the majority of modern vehicles, certain doors of the bodywork and more particularly the front doors, are provided with windows having a pivoting pane system forming a deflector associated with a fixed or opening pane, in such a manner as to produce the optimum ventilating conditions for the comfort of the passengers.

In certain systems, the pillar or the slideway separating the part forming the deflector or the sliding part disappears when the moving pane is lowered and therefore does not hinder lateral vision.

In every case, whether these pillars are fixed or disappearing, they constitute an opaque pillar which hinders visibility when the windows are closed.

It is the object of the invention to replace the opaque pillar by a transparent slideway-pillar made of plastic material (polystyrene or nylon), or even of Plexiglas, and having a cross section giving it the necessary strength and permitting satisfactory guiding of the pane and satisfactory sealing.

The accompanying drawing illustrates, by way of example, one embodiment of a transparent pillar according to the invention.

Figure 1:
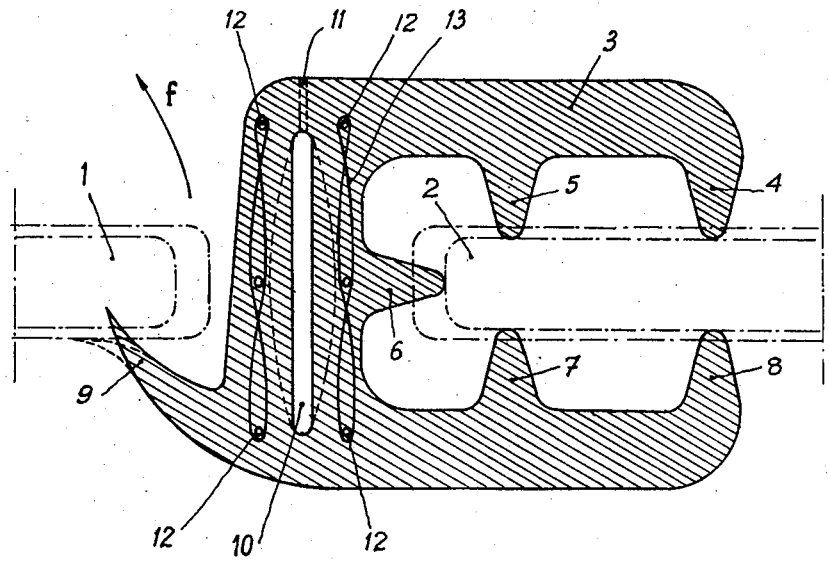
Fig. 1 shows a pillar seen in horizontal transverse section.

Referring to Figure 1, it will be seen that the pivoting pane 1 and the pane 2 which slides down are situated one on each side of the main body of the transparent pillar 3 which has a U-shaped cross-section. This body 3 is constructed in such a manner that it has internal projections 4, 5, 6, 7 and 8, on the arms of the U, which projections are intended to ensure the terminal and lateral sealing in relation to the sliding pane 2.

At the same time, in order to permit the movement of the pivoting pane 1 in the direction of the arrow f, there is provided on one side of the U a thin lip 9 having a certain resilience and intended to rest closely against the pane 1 when the latter is turned back in the opposite direction to f.

Figure 2:
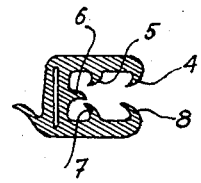
Fig. 2 illustrates, on a smaller scale, a modification of this device.

In the modification shown in Figure 2, the tips 4, 5, 6, 7 and 8 have a pointed shape different from that indicated in Figure 1 so as to constitute true tongues which bear with force against the sides of the pane 2.

In all the embodiments, a pressure relief cavity 10 is provided which is flat or slightly elliptical in shape (as shown in dotted line in Figure 1) to afford relief to pressure from close engagement with either or both panes.

The pillar 3 thus constructed, may be made either from moulded unitary lengths corresponding to the height of the pane to be fitted, or (by means of an extruding machine), in an uninterrupted section, from which the lengths required to make the fittings are parted off.

The cavity 10 may be made with a special extruding machine wherein a supplementary feed, beyond the normal nozzle of the extruding machine, permits the closing of the passage 11, made temporaliy to permit the extrusion.

The main body of the plastic material selected should be strong enough to hold the panes 1 and 2 well in position, to resist the lateral pressure due to air displacements and the accidential pressures liable to arise from the thrust of a passenger's body on the inside or of anyone who may unintentionally rest his hand on the pillar.

Finally, the material selected should be sufficiently translucent not to hinder vision. In this manner, there is no interruption in the whole expanse of the opening provided in the doors of the vehicle and a large contribution is made to increasing the internal visibility and light.

Provision may be made in these pillars for the addition of metal reinforcements such as 12, distributed according to a very rational arrangement in order to increase the rigidity, and intertwined with connecting wires such as 13, illustrated diagrammatically in Figure 1.

In order not to reduce the visibility, these reinforcements are made of a material such as polished aluminum so as not to make a blemish inside the transparent body and, on the contrary, to reflect the rays of light which may strike them.

Such a pillar may also be applied to the draft deflectors provided at the sides of the vehicle in modern windshields with highly accentuated curvature such as those described and illustrated in my patent application Ser. No. 497,307, filed March 28, 1955, and now abandoned.

Figure 3:
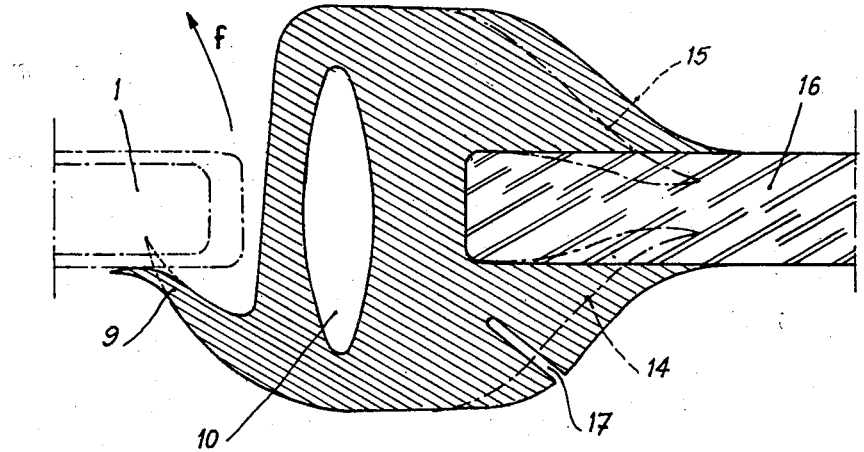
Fig. 3 shows a specific application of the pillar.

In this case, the side of the pillar situated at the edge of the windshield is made tight-fitting by judicious dimensioning and by omission of the projections 4 to 8, the glass of the windshield being fixed. The section adopted is then as shown in Figure 3 where the arms 14 and 15 have to be forced apart to set the windshield 16 when it is fitted. The slot 17 represents a housing for the hooks for the metal trimming which sometimes covers the rubber frame of the windshield by way of embellishment.

I claim:

1. A pillar for a motor vehicle for windows and like openings adapted to receive a transparent pane, which comprises an elongated element formed from a transparent material, said element being of U-shaped transverse cross section and defining an elongated channel for reception of the pane, said channel being provided internally with means adapted to bear against the pane to effect sealing engagement therewith, said element being formed with a wholly-enclosed confined cavity adjacent the inner end of said channel and thereby adjacent the corresponding edge of said pane.

2. A pillar for a motor vehicle for windows and like openings adapted to receive a transparent pane and to be engaged by a pivoted pane, which comprises an elongated element formed from a transparent material, said element being of U-shaped transverse cross section and defining an elongated channel for reception of the first-named pane, said channel being provided internally with means adapted to bear against the first-named pane to effect sealing engagement therewith, and said element having a thin outwardly-extending tongue for engagement with said pivoted pane when it is brought into closed position in alignment with said first-named pane, said element being formed with a wholly-enclosed confined cavity adjacent the inner end of said channel and thereby disposed between the opposed edges of said panes.

3. A pillar for a motor vehicle for windows and like openings adapted to receive a sliding transparent pane and to be engaged by a pivoted pane, which comprises an elongated element formed from a transparent material, said element being of U-shaped transverse cross section and defining an elongated channel for reception of the first-named pane, said channel being provided internally with a plurality of projections adapted to bear against the first-named pane to effect frictional sealing engagement therewith, and said element having a thin outwardly-extending tongue for engagement with said pivoted pane when it is brought into closed position in alignment with said first-named pane, said element being formed with a wholly-enclosed confined cavity adjacent the inner end of said channel and thereby disposed between the opposed edges of said panes.

4. A pillar for a motor vehicle for windows and like openings adapted to receive a sliding transparent pane and to be engaged by a pivoted pane, which comprises an elongated element formed from a transparent material, said element being of U-shaped transverse cross section and defining an elongated channel for reception of the first-named pane, said channel being provided internally with a plurality of projections adapted to bear against the first-named pane to effect frictional sealing engagement therewith, and said element having a thin outwardly-extending tongue for engagement with said pivoted pane when it is brought into closed position in alignment with said first-named pane, said element being formed with a wholly-enclosed confined cavity adjacent the inner end of said channel, and reinforcement means between said cavity and said channel and thereby disposed between the opposed edges of said panes.

References Cited in the file of this patent

UNITED STATES PATENTS

| | | |
|---|---|---|
| 1,259,117 | McCormick | Mar. 12, 1918 |
| 1,646,743 | Bernard | Oct. 25, 1927 |
| 2,428,731 | Abrams | Oct. 7, 1947 |
| 2,461,955 | Barnes | Feb. 15, 1949 |
| 2,569,955 | Schassenberger | Oct. 2, 1951 |
| 2,606,635 | Clingman | Aug. 12, 1952 |
| 2,766,494 | Stremmel | Oct. 16, 1956 |

FOREIGN PATENTS

| | | |
|---|---|---|
| 419,503 | Great Britain | Nov. 13, 1934 |